3,155,698
METHOD OF PREPARING ALKYL SILANES
Siegfried Nitzsche and Paul Buchheit, Burghausen, Bavaria, Germany, assignor to Wacker-Chemie G.m.b.H., Munich, Bavaria, Germany
No Drawing. Filed May 24, 1962, Ser. No. 197,239
Claims priority, application Germany June 22, 1961
5 Claims. (Cl. 260—448.2)

This invention relates to a method for preparing alkylsilanes and more particularly to a method for obtaining an increased yield of alkylhydrogensilanes by reacting alkylhalides with silicon.

One of the commercial methods employed for the preparation of aryl- and alkylchlorosilanes is the so-called direct process. The direct process utilizes the reaction of an aryl chloride or alkyl chloride with silicon to produce aryl or alkylchlorosilicon compounds. Generally the direct process is carried forward with finely divided silicon in the presence of other metals and catalysts. The aryl or alkyl chloride, or other aryl or alkyl halides, are passed through the mass containing finely divided silicon at an elevated temperature, e.g. 250° to 500° C. The direct process is well known and is documented by United States Patent Nos. 2,380,995, 2,380,996, 2,380,997 and 2,380,998; 2,447,873; 2,640,065; 2,666,775; 2,666,776; 2,877,254 and many others as well as in texts such as "Gmelins Handbuch der anorganischen Chemie," 8th edition, Silicon, Part C, Weinheim, 1958, pages 124–127.

Among the varied products obtained through the direct process, one commercially attractive and important class of products is alkylhydrogendichlorosilanes ($RHSiCl_2$)

Such silanes, and particularly methylhydrogendichlorosilanes, are useful as intermediates in the preparation of vinyl-, phenyl-, cyanoalkyl-, and fluorohydrocarbon substituted alkylsilanes. Furthermore, the alkylhydrogendichlorosilanes are hydrolyzed and condensed to produce alkylhydrogensiloxanes which are useful as water-repellent and adhesive impregnants for textiles, leather, papers and other base materials.

In view of the usefulness of the alkylhydrogendichlorosilanes, it is not surprising that extensive efforts have been made to increase the yield of such products obtained through the direct process. One proposed modification of the direct process employs mixtures of alkylhalide and hydrogenchloride as the gaseous reaction mass passed through powdered silicon. This modification produces large volumes of undesired silanes such as $HSiCl_3$ and $SiCl_4$ but does not significantly increase the yield of $RHSiCl_2$. Another proposed modification employs mixtures of alkyl chloride and hydrogen as the gaseous reactant, but the yield of $RSiHCl_2$ obtained remains quite low.

It is the object of this invention to introduce a novel procedure for reacting RCl with Si to produce $RHSiCl_2$. A modified direct process whereby large yields of organohydrogendichlorosilane are obtained is also sought. Other objects and advantages of this invention are detailed in or will be apparent from the disclosure and claims following.

This invention consists of reacting methyl chloride or ethyl chloride with a powdery mass containing silicon characterized in that 0.1 to 3% by weight, calculated on the weight of silicon present, of a chloride of zirconium is added to the powdery mass.

The powdery mass employed is generally described as a fluid bed. The fluid beds employed herein are basically any of those fluid beds presently employed in the art. Alloys of 80 to 98.99% by weight finely divided silicon, 1 to 19.7% by weight finely divided copper or activated copper compounds, and 0.1 to 0.3% by weight aluminum are particularly useful as fluid beds. The fluid beds can also contain a total of up to 10% by weight of iron, nickel, cobalt, antimony, phosphorous and other activating alloy additives as well as the contaminants generally found in the alloys employed (e.g. boron, germanium and so forth). It is preferred to keep the iron concentration below 5 percent by weight.

The fluid beds are made up of finely divided materials. It is preferred that at least 50%, and most preferably 70 to 90%, by weight of the fluid bed materials consist of particles with diameter below 0.35 mm. with the remaining particles having diameters below 3 mm.

The chlorides of zirconium employed are preferably inorganic chlorides such as zirconium oxychlorides which may contain water of crystallization as in $ZrOCl_2 \cdot 8H_2O$, as well as $ZrCl_2$, $ZrCl_3$ and $ZrCl_4$. Also operative are hexachlorozirconates such as $Y_2^I ZrCl_6$ and $Y^{II} ZrCl_6$ where $Y^I$ is Li, Na, K, Rb, or Cs (i.e. an alkaline metal) and where $Y^{II}$ is Mg, Ca, Sr, or Ba (i.e. an alkaline earth metal) or $Y^I$ and $Y^{II}$ are transistion metals insofar as they may be electropositively mono- or divalent (i.e. $Y^I$ can be Ag or Cu and $Y^{II}$ can be Zn, Ni, Cu or Fe). When an organic solvent solution of the chloride of zirconium is to be employed, organic zirconuium halides such as the reaction product of $ZrCl_4$ with ethylene oxide dissolved in $CCl_4$ can be employed.

The chloride of zirconium can be added to the powdery mass of the fluid bed in any desired and appropriate manner. The various ingredients can be mixed and powdered in a ball mill. Alternatively, the admixing can be accomplished in a reaction oven wherein the silicon mass is agitated. Another method for incorporating the chloride of zirconium in the fluid bed material is by adding thereto a solution or dispersion of the chloride of zirconium in water or organic solvent.

A recommended embodiment of this invention includes the use of 3 to 10 percent by weight of copper I chloride based on the weight of the fluid bed materials. The copper I chloride can be added to the fluid bed material prior to, concurrently with or subsequent to the addition of the chloride of zirconium to the mass.

The alkyl chloride is reacted with the silicon in the powdery mass by well known techniques. The alkyl chloride can be passed over or through the silicon containing mass while such mass is quiescent, mildly agitated or strongly agitated. The silicon containing powdery mass can be dispersed in an inert fluid such as a high boiling mineral oil and the alkyl chloride passed through such dispersion. The reaction temperature is commonly 250°–500° C. and can be outside such limits if desired but best results are achieved in the indicated range. The reaction pressure can be from slightly below atmospheric (i.e. 0.5 atmosphere) to superatmospheric (i.e. 5–10 atmospheres) but the best results are achieved at a pressure of 1 to 4 atmospheres. It is to be understood that any of the conventional practices described in the direct process art can be incorporated into the improved process of this invention.

The following examples are included to aid in understanding and practicing this invention. The scope of the invention is delineated in the claims and is not limited by the examples. All parts and percentages in the examples are based on weight unless otherwise indicated.

EXAMPLE 1

A vertical steel tube 100 mm. wide and 450 mm. high was fitted with a stirring mechanism and 1500 g. of silicon alloy was charged to the tube. The contents of the tube were heated to 290° C. under nitrogen atmosphere and methyl chloride was conducted through the silicon alloy charge from the bottom of the tube through the top at a temperature of 290°–310° C. with slow stirring of the silicon alloy. The silicon alloy charged contained 70% of particles of not more than .35 mm. diameter and the remainder of the particles had diameters in the range of .35 to 3.0 mm. The additives employed were admixed with the silicon alloy in a ball mill.

The volatile reaction products were condensed in a cold trap at −20° C. and the condensate was separated into components by fractional distillation. The preparations numbered 1–4 employed a silicon alloy containing 86% Si, 10% Cu, 3.59% Fe, 0.04% Al and 0.37% Ca, Mg and $SiO_2$. The silicon alloy for all other preparations contained 85% Si, 10% Cu, 4.3% Fe, 0.2% Al and 0.5% Ca, Mg and $SiO_2$.

The results of several preparations including control preparations for comparative purposes are outlined in Table I. In the table, column 1 gives the type and relative quantities of additives employed with the silicon alloy. Column 2 gives the amount of alkyl chloride (methyl chloride for preparation 1–13) conducted through the silicon alloy during the duration of the preparation. Column 3 gives the quantity of condensate obtained and the subsequent columns detail the composition of the condensate in weight percentages with the separate compounds indicated as follows: H indicates $CH_3SiHCl_2$, T indicates $(CH_3)_3SiCl$, M indicates $CH_3SiCl_3$, D indicates $(CH_3)_2SiCl_2$, Q indicates $SiCl_4$, UR indicates undistilled residue and includes those materials having a boiling point above 75° C., and V is rectification loss and consists primarily of unreacted $CH_3Cl$ which had been dissolved in the raw reaction product.

silane and $SiCl_4$ and still containing some ethyldichlorosilane. At temperatures between 72.5° and 75.0° C. a fraction consisting of practically pure ethyldichlorosilane was obtained. The portions distilling over at 75–100° C. (primarily ethyltrichlorosilane) still contained some ethyldichlorosilane. The silanes with more than two ethyl groups were left in the distillation retort as residue.

*Table II*

| Prep. No. | Additives | First Run, percent | Ethyldichlorosilane, percent | Ethyltrichlorosilane, percent | Residue |
|---|---|---|---|---|---|
| 14 | 7.66% Cu-I-Cl | 16.6 | 12.5 | 53.8 | 17.1 |
| 15 | 7.66% Cu-I-Cl; 2.0% $ZrOCl_2$ | 27.3 | 20.4 | 35.3 | 17.0 |
| 16 | 7.66% Cu-I-Cl; 2.0% $ZrOCl_2$ | 10.7 | 24.0 | 41.4 | 14.9 |
| 17 | 7.66% Cu-I-Cl; 2.0% $ZrOCl_2$ | 19.5 | 21.7 | 40.0 | 18.8 |

That which is claimed is:

1. In the method for preparing alkylchlorosilanes by reacting an alkyl chloride with finely divided silicon at a temperature in the range of 200° to 500° C. the improvement consisting essentially of admixing 0.1 to 3 percent by weight calculated on the weight of the silicon present of a chloride of zirconium with the finely divided silicon prior to the reaction whereby the yield of alkylhydrogenchlorosilanes is increased.

2. The method of claim 1 wherein the chloride of zirconium is zirconium oxychloride.

3. The method of claim 1 wherein the chloride of zirconium is zirconium tetrachloride.

4. The method of claim 1 wherein the chloride of zirconium is a hexachlorozirconate of a metal selected from the group consisting of Li, Na, K, Rb, Cs, Mg, Ca, Sr, Ba, Ag, Cu, Zn, Ni and Fe.

5. The method of claim 1 further characterized in that the silicon reactant is present as a silicon alloy consisting essentially of 80–98.99% by weight Si, 1–19.7% by weight Cu and 0.1 to 0.3% by weight Al.

*Table I*

| Preparation No. | Additives wt. percent calculated on silicon alloy | Quantity of methyl chloride led through/ Duration of test | Condensate obtained in g. | Composition of the condensate | | | | | | |
|---|---|---|---|---|---|---|---|---|---|---|
| | | | | H, percent | M, percent | T, percent | D, percent | Q, percent | UR, percent | V, percent |
| 1 | 7.66% Cu-I-Cl | 3,690 g./76 hrs | 3,640 | 2.8 | 2.3 | 17.8 | 63.6 | 2.3 | 3.2 | 8.0 |
| 2 | 7.66% Cu-I-Cl | 3,870 g./78 hrs | 3,910 | 3.9 | 2.0 | 18.1 | 62.4 | 2.0 | 2.8 | 8.8 |
| 3 | 7.66% Cu-I-Cl | 3,560 g./72 hrs | 3,600 | 3.3 | 2.0 | 16.2 | 63.8 | 2.0 | 2.7 | 11.0 |
| 4 | 7.66% Cu-I-Cl; 1.33% $ZrOCl_2$ | 3,655 g./76 hrs | 3,870 | 10.8 | 1.6 | 42.5 | 34.3 | 1.6 | 2.2 | 7.0 |
| 5 | 7.66% Cu-I-Cl | 3,755 g./81 hrs | 3,860 | 5.2 | 1.4 | 15.6 | 61.6 | 1.4 | 2.9 | 11.9 |
| 6 | 7.66% Cu-I-Cl | 4,060 g./93 hrs | 4,120 | 5.0 | 1.5 | 12.9 | 64.9 | 1.4 | 2.9 | 11.4 |
| 7 | 7.66% Cu-I-Cl; 2.00% $ZrOCl_2$ | 4,545 g./82 hrs | 4,058 | 24.1 | 2.6 | 23.0 | 28.5 | 2.6 | 2.7 | 16.5 |
| 8 | 6.67% Cu-I-Cl; 1.00% $ZrOCl_2$ | 3,876 g./85 hrs | 3,949 | 26.3 | 1.3 | 21.6 | 31.7 | 1.2 | 2.1 | 15.8 |
| 9 | 5.00% Cu-I-Cl; 1.33% $ZrCl_4$ | 4,397 g./103 hrs | 4,183 | 28.4 | 2.0 | 28.9 | 27.0 | 2.0 | 2.0 | 9.7 |
| 10 | | 3,617 g./83 hrs | 3,518 | 24.6 | 1.9 | 28.0 | 28.5 | 1.9 | 2.1 | 13.0 |
| 11 | 6.67% Cu-I-Cl; 0.70% $ZrOCl_2$ | 3,583 g./90 hrs | 3,941 | 25.8 | 2.2 | 19.3 | 34.2 | 2.1 | 2.2 | 14.2 |
| 12 | 5.00% Cu-I-Cl; 0.90% $Ni(ZrCl_6)$ | 3,775 g./82 hrs | 3,328 | 30.3 | 1.3 | 25.4 | 25.9 | 1.3 | 2.3 | 13.5 |
| 13 | 5.00% Cu-I-Cl; 0.90% $Zn(ZrCl_6)$ | 4,107 g./84 hrs | 4,135 | 18.6 | 2.2 | 21.9 | 39.3 | 2.2 | 2.1 | 13.7 |

EXAMPLE 2

Ethyl chloride was conducted over an alloy of the same composition and with the same additives as in preparations 5, 6 and 7 at 305°–315° C. (preparations 14–17), employing the techniques of Example 1. The condensate was freed of unreacted ethyl chloride as described in the procedure of Example 1 and distilled by fractionation. Up to a column head temperature of 72.5° C. a first running distilled off consisting principally of trichloro- References Cited in the file of this patent

UNITED STATES PATENTS 2,447,873    Rochow _____ Aug. 24, 1948

FOREIGN PATENTS 708,823    Great Britain _____ May 12, 1954

OTHER REFERENCES

Setinek et al.: 51, Chem. Abstracts, 4936 (1957).

UNITED STATES PATENT OFFICE
CERTIFICATE OF CORRECTION

Patent No. 3,155,698                                                   November 3, 1964

Siegfried Nitzsche et al.

It is hereby certified that error appears in the above numbered patent requiring correction and that the said Letters Patent should read as corrected below.

Column 1, line 41, for "adhesive" read -- abhesive --.

Signed and sealed this 30th day of March 1965.

(SEAL)
Attest:

ERNEST W. SWIDER                                              EDWARD J. BRENNER
Attesting Officer                                                   Commissioner of Patents